United States Patent
Ferber et al.

(10) Patent No.: US 10,412,430 B2
(45) Date of Patent: Sep. 10, 2019

(54) METHOD AND SYSTEM FOR RECOMMENDING TARGETED TELEVISION PROGRAMS BASED ON ONLINE BEHAVIOR

(71) Applicant: Amobee, Inc., Redwood City, CA (US)

(72) Inventors: Scott Andrew Ferber, Bethesda, MD (US); Aleck Howard Schleider, Reisterstown, MD (US); D. Bryan Jones, Austin, TX (US)

(73) Assignee: Amobee, Inc., Redwood City, CA (US)

( * ) Notice: Subject to any disclaimer, the term of this patent is extended or adjusted under 35 U.S.C. 154(b) by 0 days.

(21) Appl. No.: 14/289,571

(22) Filed: May 28, 2014

(65) Prior Publication Data

US 2015/0350706 A1 Dec. 3, 2015

(51) Int. Cl.
*H04N 21/25* (2011.01)
*H04N 21/258* (2011.01)
*H04N 21/2668* (2011.01)
*G06Q 30/00* (2012.01)
*G06Q 30/02* (2012.01)
*H04N 21/4788* (2011.01)

(52) U.S. Cl.
CPC ......... *H04N 21/251* (2013.01); *G06Q 30/00* (2013.01); *G06Q 30/0251* (2013.01); *H04N 21/25891* (2013.01); *H04N 21/2668* (2013.01); *H04N 21/4788* (2013.01)

(58) Field of Classification Search
CPC ......... H04N 21/251; H04N 21/25891; H04N 21/2668; H04N 21/4788
See application file for complete search history.

(56) References Cited

U.S. PATENT DOCUMENTS

| | | | |
|---|---|---|---|
| 7,590,993 B1 | 9/2009 | Hendricks | |
| 2005/0144499 A1* | 6/2005 | Narahara | H04H 60/31 714/1 |
| 2007/0074258 A1 | 3/2007 | Wood | |
| 2008/0259906 A1 | 10/2008 | Shkedi | |
| 2010/0145791 A1 | 6/2010 | Canning | |
| 2012/0124630 A1 | 5/2012 | Wellen et al. | |
| 2012/0158461 A1 | 6/2012 | Aldrey et al. | |
| 2012/0204109 A1* | 8/2012 | Julia et al. | 715/716 |

(Continued)

FOREIGN PATENT DOCUMENTS

WO 2011100094 A2 8/2011

OTHER PUBLICATIONS

Theodoros Bozios, "Advanced Techniques for Personalized Advertising in a Digital TV Environment: The iMEDIA System," In Proceedings of the eBusiness and eWork Conference, 2001.

(Continued)

*Primary Examiner* — Yassin Alata
(74) *Attorney, Agent, or Firm* — Kwan & Olynick LLP

(57) ABSTRACT

Methods, systems, and programming for recommending targeted television programs based on online behavior is provided. In one example, information related to one or more online activities of a user is received. An identifier associated with the user is determined. Information related to television consumption of the user is assessed based on the identifier. An index is generated based on the online activity information and the television consumption information. One or more recommendations are generated based on the index.

19 Claims, 15 Drawing Sheets

1302

| Network | Program | "Young Children" |
|---|---|---|
| NICK | Victorious | 215 |
| NICK | Max & Ruby | 212 |
| NICK | SpongeBob ... | 199 |
| NICK | Teenage Mutant ... | 195 |
| TOON | Star Wars: Clone ... | 180 |
| TOON | Robots | 177 |
| AFAM | Pretty Little Liars | 172 |
| A&E | Duck Dynasty | 141 |
| CW | 90210 | 135 |
| AMC | Walking Dead | 134 |

1304

| Network | Program | "Angry Birds" |
|---|---|---|
| NBC | The Office | 151 |
| FOX | New Girl | 142 |
| NBC | Parks & Recreation | 139 |
| COM | The Daily Show ... | 133 |
| ABC | Modern Family | 132 |
| COM | The Colbert Report | 132 |
| COM | The Jeselnik ... | 132 |
| FX | Archer | 132 |
| USA | Psych | 129 |
| TOON | Green Lantern ... | 128 |

(56) References Cited

U.S. PATENT DOCUMENTS

2012/0284746 A1 11/2012 Evans et al.
2013/0238413 A1* 9/2013 Carlson .............. G06Q 30/0224
　　　　　　　　　　　　　　　　　　　　　　　705/14.25
2014/0075463 A1 3/2014 Kamdar

OTHER PUBLICATIONS

"Nielsen to Integrate Set Top Box Data From WPP'S Kantar Media into Local TV Audience Measurement," Nielsen Press Room, Jul. 26, 2011.
"Rentrak's 'Sitckiness' Mines TV Value on Granular Level," MediaPost Publications, Jan. 28, 2010.
International Search Report and Written Opinion dated Aug. 11, 2015 in International Application PCT/US2015/032387.
International Preliminary Report on Patentability dated Nov. 29, 2016 in International Application PCT/US2015/032387.

* cited by examiner

1302

| Network | Program | "Young Children" |
|---|---|---|
| NICK | Victorious | 215 |
| NICK | Max & Ruby | 212 |
| NICK | SpongeBob … | 199 |
| NICK | Teenage Mutant … | 195 |
| TOON | Star Wars: Clone … | 180 |
| TOON | Robots | 177 |
| AFAM | Pretty Little Liars | 172 |
| A&E | Duck Dynasty | 141 |
| CW | 90210 | 135 |
| AMC | Walking Dead | 134 |

1304

| Network | Program | "Angry Birds" |
|---|---|---|
| NBC | The Office | 151 |
| FOX | New Girl | 142 |
| NBC | Parks & Recreation | 139 |
| COM | The Daily Show … | 133 |
| ABC | Modern Family | 132 |
| COM | The Colbert Report | 132 |
| FX | The Jeselnik … | 132 |
| FX | Archer | 132 |
| USA | Psych | 129 |
| TOON | Green Lantern … | 128 |

Fig. 13

METHOD AND SYSTEM FOR RECOMMENDING TARGETED TELEVISION PROGRAMS BASED ON ONLINE BEHAVIOR

CROSS-REFERENCE TO RELATED APPLICATIONS

The present application is related to a U.S. patent application having application Ser. No. 14/289,550, filed on May 28, 2014, entitled "METHOD AND SYSTEM FOR TARGETED ADVERTISING BASED ON ASSOCIATED ONLINE AND OFFLINE USER BEHAVIORS," a U.S. patent application having application Ser. No. 14/289,564, filed on May 28, 2014, entitled "METHOD AND SYSTEM FOR ADVERTISEMENT CONVERSION MEASUREMENT BASED ON ASSOCIATED DISCRETE USER ACTIVITIES," and a U.S. patent application having application Ser. No. 14/289,559, filed on May 28, 2014, entitled "METHOD AND SYSTEM FOR ASSOCIATING DISCRETE USER ACTIVITIES ON MOBILE DEVICES," all of which are incorporated herein by reference in their entireties.

BACKGROUND

1. Technical Field

The present teaching relates to methods and systems for advertising and/or recommendations. Specifically, the present teaching relates to methods and systems for targeted advertising, conversation measurement, and/or recommendations of targeted television programs.

2. Discussion of Technical Background

The rapid development of digital content access platforms, such as the Internet, mobile Internet, and smart TV, has made it possible for a user to electronically access virtually any content at any time from any location using any device. Such free access to digital content without limitations in time, space, or platforms has enabled great opportunity for advertisers and publishers in advertising. On the other hand, with the explosion of information, it has become increasingly important to provide users with advertisement that is relevant to the user.

Efforts have been made to attempt to deliver advertisements to targeted users who are most likely interested in the advertisements. A shortcoming of the traditional approaches is that it merely aggregates user activities on a particular platform while a user's everyday life spans across multiple platforms. For example, users' explicit interests (e.g., user's preferences declared in social networks) or implicit interests (e.g., interests inferred by analyzing the user's online content consumption) have been collected online and used as a basis for targeted advertising by known approaches. However, online behaviors constitute only a portion of a user's daily activities, which, sometimes, are insufficient to build a comprehensive and accurate user profile for the purpose of targeted advertising. This is particularly true for certain users, who are not used to using the Internet, such as elderly people. Even on the same platform, e.g., online platform, a user's activities also span cross different devices, which makes the traditional approaches even more ineffective in capturing the user's online behaviors to build a comprehensive and accurate user profile. For example, traditional approaches rely primarily on cookies in tracking users' online activities. However, these approaches are no longer suitable in today's mobile world as mobile devices usually do not have reliable cookies. As another example on the TV platform, there is currently no way to use online digital data, such as media consumption and transaction data, to create personalized TV programs to appropriate audiences.

Another line of efforts in attempting to optimize targeted advertising have been made to measure the advertisement conversion rate, which is the rate at which an advertisement exposure event leads to a corresponding advertisement conversion event. The underlying goal is to provide an indicator to the marketers, e.g., advertisers or publishers, regarding the effectiveness of their advertisements, advertisement placements, etc. The convergence of consumer devices over the past several years has created a situation where the average consumer digests media from multiple devices at different platforms (e.g., online, offline, TV, etc.) on a daily basis. For example, different activities may be performed on different devices or platforms, e.g., being exposed to an advertisement of a product on one device but making online purchase of the advertised product on another device. Sometimes, the purchase may even be made offline, e.g., at a local store. In addition, as there is a gap in time between viewing an advertisement and the actual transaction caused by the advertisement, it is even harder to link the viewing activity and purchasing activity across time. Furthermore, one user in a user group, e.g., a household, may be exposed to an advertisement but a different user from the same user group may make the purchase. These create difficulties in estimating the conversion rate of an advertisement.

Traditional approaches, however, are unable to handle the difficulties as they evaluate advertisement conversion at each platform separately to judge effectiveness or, more commonly, use a guesstimate to approximate their return on investment (ROI) on advertisement spending. For example, advertisers traditionally utilize modeling and assumptions to track the effectiveness of their campaigns, often using metrics such as click through rate (CTR) to approximate sales. However, the use of CTR or other traditionally-utilized often produce inaccurate information regarding the effectiveness of the advertising campaigns and, as a result, inhibit the ability of advertisers (or other entities) to optimize advertisement spending.

SUMMARY

The present teaching relates to methods and systems for advertising and/or recommendations. Specifically, the present teaching relates to methods and systems for targeted advertising, conversation measurement, and/or recommendations of targeted television programs.

In one example, a method, implemented on at least one machine, each having at least one processor, storage, and a communication platform connected to a network for recommending targeted television programs is presented. Information related to one or more online activities of a user is received. An identifier associated with the user is determined. Information related to television consumption of the user is accessed based on the identifier. An index is generated based on the online activity information and the television consumption information. One or more recommendations are generated based on the index.

In another example, a method, implemented on at least one machine, each having at least one processor, storage, and a communication platform connected to a network for recommending targeted television programs is presented. Information related to online activities of one or more users is received. The one or more users comprise a user. A characteristic related to an online activity performed by the user is determined based on the online activity information. Information related to television programs consumed by the one or more users is received. A television program consumed by the user is determined based on the television consumption information. An index that associates the characteristic with the television program is generated based on the determination of the characteristic and the television program. One or more recommendations are generated based on the index.

In a different example, a system having at least one processor, storage, and a communication platform for recommending targeted television programs is presented. The system includes an indexing module and a recommendation module. The indexing module is configured to: receive information related to one or more online activities of a user; determine an identifier associated with the user; access information related to television consumption of the user based on the identifier; and generate an index based on the online activity information and the television consumption information. The recommendation module is configured to generate one or more recommendations based on the index.

In another example, a system having at least one processor, storage, and a communication platform for recommending targeted television programs is presented. The system includes an indexing module and a recommendation module. The indexing module is configured to: receive information related to online activities of one or more users, wherein the one or more users comprise a user; determine, based on the online activity information, an characteristic related to an online activity performed by the user; receive information related to television programs consumed by the one or more users; determine, based on the television consumption information, a television program consumed by the user; and generate, based on the determination of the characteristic and the television program, an index that associates the characteristic with the television program. The recommendation module is configured to generate one or more recommendations based on the index.

Other concepts relate to software for recommending targeted television programs. A software product, in accord with this concept, includes at least one non-transitory machine-readable medium and information carried by the medium. The information carried by the medium may be executable program code data regarding parameters in association with a request or operational parameters, such as information related to a user, a request, or a social group, etc.

In one example, a non-transitory machine readable medium having information recorded thereon for recommending targeted television programs is presented. The recorded information, when read by the machine, causes the machine to perform a series of steps. Information related to one or more online activities of a user is received. An identifier associated with the user is determined. Information related to television consumption of the user is accessed based on the identifier. An index is generated based on the online activity information and the television consumption information. One or more recommendations are generated based on the index.

In another example, a non-transitory machine readable medium having information recorded thereon for recommending targeted television programs is presented. The recorded information, when read by the machine, causes the machine to perform a series of steps. Information related to online activities of one or more users is received. The one or more users comprise a user. A characteristic related to an online activity performed by the user is determined based on the online activity information. Information related to television programs consumed by the one or more users is received. A television program consumed by the user is determined based on the television consumption information. An index that associates the characteristic with the television program is generated based on the determination of the characteristic and the television program. One or more recommendations are generated based on the index.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 13 depicts indices that associate characteristics of online activities with television programs, according to an embodiment of the present teaching;

DETAILED DESCRIPTION

Figure 1:
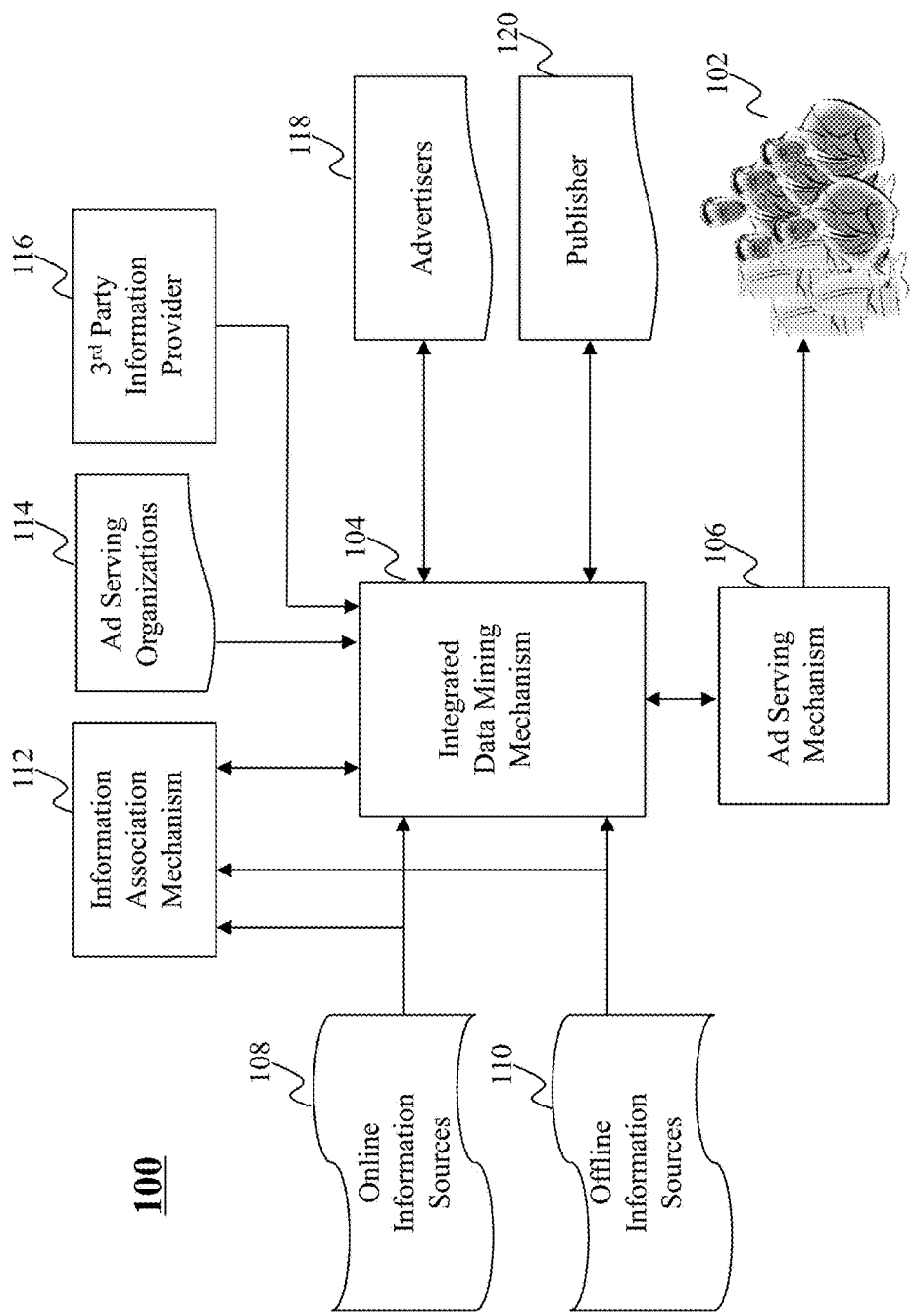
FIG. 1 depicts an exemplary system diagram for serving advertisement based on integrated data mining, according to an embodiment of the present teaching.

In the following detailed description, numerous specific details are set forth by way of examples in order to provide a thorough understanding of the relevant teachings. However, it should be apparent to those skilled in the art that the present teaching may be practiced without such details. In other instances, well known methods, procedures, components, and/or circuitry have been described at a relatively high-level, without detail, in order to avoid unnecessarily obscuring aspects of the present teaching.

One aspect of the present teaching is to improve the accuracy of estimating conversion rates by recognizing seemingly discrete activities performed by different users or on different devices/platforms, and linking them to the underlying advertisement that was exposed and subsequently led to the corresponding conversion activities. For example, the present teaching is able to link together these disparate elements into a common framework and measure offline transactions from cross-device advertisement exposure to enable marketers (e.g., advertisers, publishers, etc.) to maximize the return on their marketing investments. The marketers are able to find out how actual sales of product or service are impacted or driven by specific types of advertisements or platforms on which advertisements are served. The present teaching thus allows the marketers to correlate e-commerce and offline sales to specific users or user groups and campaigns in order to better understand the relationship between advertisement investment and revenue.

Another aspect of the present teaching is to create personal identifications that persist across time with respect to each user of mobile devices, for example, in the absence of cookies so that the conversion rate in the mobile space can be more accurately estimated. For example, whenever a user is exposed to an advertisement, information regarding the user's device, IP address, etc., may be obtained (e.g., device identifier, browser identifier, IP address, etc.). Such information may be used to generate a unique identifier for the user, and the unique identifier may be stored with information about the exposure of the advertisement. When an online conversion relating to the advertisement occurs at a later time, information regarding the user's device, IP address, etc., may again be obtained and used to generate another unique identifier. To compute the conversion rates, information on both advertisement exposures and conversions are retrieved and processed. Via the unique user identifiers (e.g., associated with exposures, associated with conversions, etc.), the conversion rates can be estimated by matching the unique identifiers associated with exposure data and the unique identifiers associated with conversion data.

Still another aspect of the present teaching is to plan and create personalized TV programs to appropriate audiences based on online and/or offline digital data collected from different digital data sources. The association between digital data and TV media consumption data allows devising useful information, such as who watches what on TV and consumes what online media and/or offline purchases, etc. Data analytics of such useful information can be used for future TV program planning by the TV program operators with respect to different audience based on online/offline digital data. In addition to benefiting TV program planning, the meaningful linkage between digital data and TV consumption data can also benefit other parties, including publishers and advertisers. For example, based on online digital data and TV consumption data, recommendations may be provided to advertisers regarding TV programs in which certain advertisements are to be incorporated, the regions in which certain advertisements are to be shown, and/or the audiences for which certain advertisements are to be presented. In addition, based on digital data and TV consumption data, recommendations may also be provided to content providers as to what media are more perceptive in which region and/or for which audience.

Additional novel features will be set forth in part in the description which follows, and in part will become apparent to those skilled in the art upon examination of the following and the accompanying drawings or may be learned by production or operation of the examples. The novel features of the present teaching may be realized and attained by practice or use of various aspects of the methodologies, instrumentalities and combinations set forth in the detailed examples discussed below.

FIG. 1 depicts an exemplary system 100 for serving advertisements to users 102 based on integrated data mining, according to an embodiment of the present teaching. The system 100 comprises an integrated data mining mechanism 104, an advertisement serving mechanism 106, online information sources 108, offline information sources 110, an information association mechanism 112, advertisement serving organizations 114, $3^{rd}$ party information providers 116, advertisers 118, and publishers 120.

Online information sources 108 may comprise any online platform on which user activities occur. User activities may comprise exposure events, conversion events, or other user activities. An exposure event may comprise consumption, either actively or passively by a user, of a piece of content, such as an advertisement or a TV program. Thus, an exposure event may also be considered a media consumption event. Examples of online advertising include contextual ads on search engine result pages, banner ads, blogs, rich media ads, interstitial ads, online classified advertising, advertising networks, and e-mail marketing. A conversion event may comprise any event that is triggered by a prior exposure event, such as a transaction that is motivated by viewing the corresponding advertisement. In another example, navigating to the advertiser's website by clicking links on the corresponding advertisement may also be a conversion event.

Additionally, or alternatively, online information sources 108 may comprise content providers, such as publishers or content distributors, where online exposure events occur. The content provides may be, for example, Yahoo!, Google, Facebook, CNN, ESPN, etc. The online information sources 108 may also include online service providers, such as e-commerce operators or e-logistics operators, where online conversion events happen. The online service providers include, for example, Amazon.com, Ebay.com, Wayfair.com, Hayneedle.com, to name a few. It is understood that, some websites may act as both online content providers and service provider as both exposure and conversion events may occur on the same website. For example, Amazon.com provides personalized product recommendations to a user, which is considered as an exposure event; the user may decide to purchase one of the recommend products at Amazon.com, which is a conversion event at the same source.

Offline information sources 110 may comprise any offline platform on which user activities occur. The offline information sources 110 may comprise retailers, such as local stores of Walmart, Whole Foods, Apple, automotive dealers, movie theaters, pharmacies, travel agencies, etc. The offline information sources 110 may also include financial institutes, such as banks, credit card companies, or insurance companies. In addition, the offline information sources 110 may include $3^{rd}$ party clearance houses or $3^{rd}$ party logistics operators. Offline user conversion events may occur and be recorded in an offline information source 110. For example, a user may purchase an advertised product at a local store using his/her credit card and opt to ship the product to his/her parents at another state. The offline conversion event may thus occur at the local retailer, and its associated information may be recorded by and retrieved from the retailer, the credit card company, or the shipping carrier. In addition to offline conversion events, exposure or media consumption events may also occur offline, in the forms of, for example, in-store advertisement or billboard advertisement. It is understood that, some entities may be both online information sources 108 and offline information sources 110. For example, the local stores of Walmart are considered as offline information sources 110 while its e-commerce website (Walmart.com) is an online information source 108.

Information about users' online and offline activities, e.g., user events, may be continuously or periodically monitored and fed into the integrated data mining mechanism 104 for associating related user events, regardless of when, where, and how the events occur, making the associations meaningful through data mining, and eventually utilizing the data mining results to optimize the advertisement serving. In this embodiment, the association of related user events may also be performed by the information association mechanism 112 that is independent of the integrated data mining mechanism 104. The information association mechanism 112 may be an entity that is dedicated on matching purchase events at different platforms for the same person or household based on, for example, personally identifiable information (PII) or physical address. The matched events may be provided to the integrated data mining mechanism 104 by the information association mechanism 112 as a service. In addition to information about related user events, information about a user, e.g., user demographic information or behavior information may be also fed into the integrated data mining mechanism 104 from the 3$^{rd}$ party information provider 116. Both user information and events association information may be used by the integrated data mining mechanism 104 in user profiling and targeted advertising.

One of the applications of the integrated data mining mechanism 104 includes targeted advertising. This may be performed in conjunction with the advertisement serving mechanism 106 in response to a request from the advertisers 118, publisher 120, or advertisement serving organizations 114. An advertiser 118, such as a manufacturer, a dealer, or an agent, may send an advertisement serving request to the integrated data mining mechanism 104 either directly, or through a publisher 120 (where the advertisement is to be presented) or a dedicated advertisement serving organization 114. Based on the received request, the integrated data mining mechanism 104 may identify the targeted users based on previously-created user profiles, which were created based on information from the online information sources 108, offline information sources 110, information from the information association mechanism 112, and/or information from the 3$^{rd}$ party information provider 116. On the other hand, the integrated data mining mechanism 104 may also track the behaviors of the targeted uses after they have been exposed with the advertisement and provide advertisement conversion measurement to the advertisers 118 and/or publishers 120 based on the tracked user behaviors as feedback to determine the effectiveness of the served advertisement.

The system 100 in FIG. 1 may be implemented in a networked environment in which some or all of the components/parties are connected through one or more networks. The network(s) may be a single network or a combination of different networks. For example, the network(s) may be a local area network (LAN), a wide area network (WAN), a public network, a private network, a proprietary network, a Public Telephone Switched Network (PSTN), the Internet, a wireless network, a virtual network, or any combination thereof. The network(s) may also include various network access points, e.g., wired or wireless access points such as base stations or Internet exchange points through which a data source may connect to the network(s) in order to transmit information via the network(s).

Figure 2:
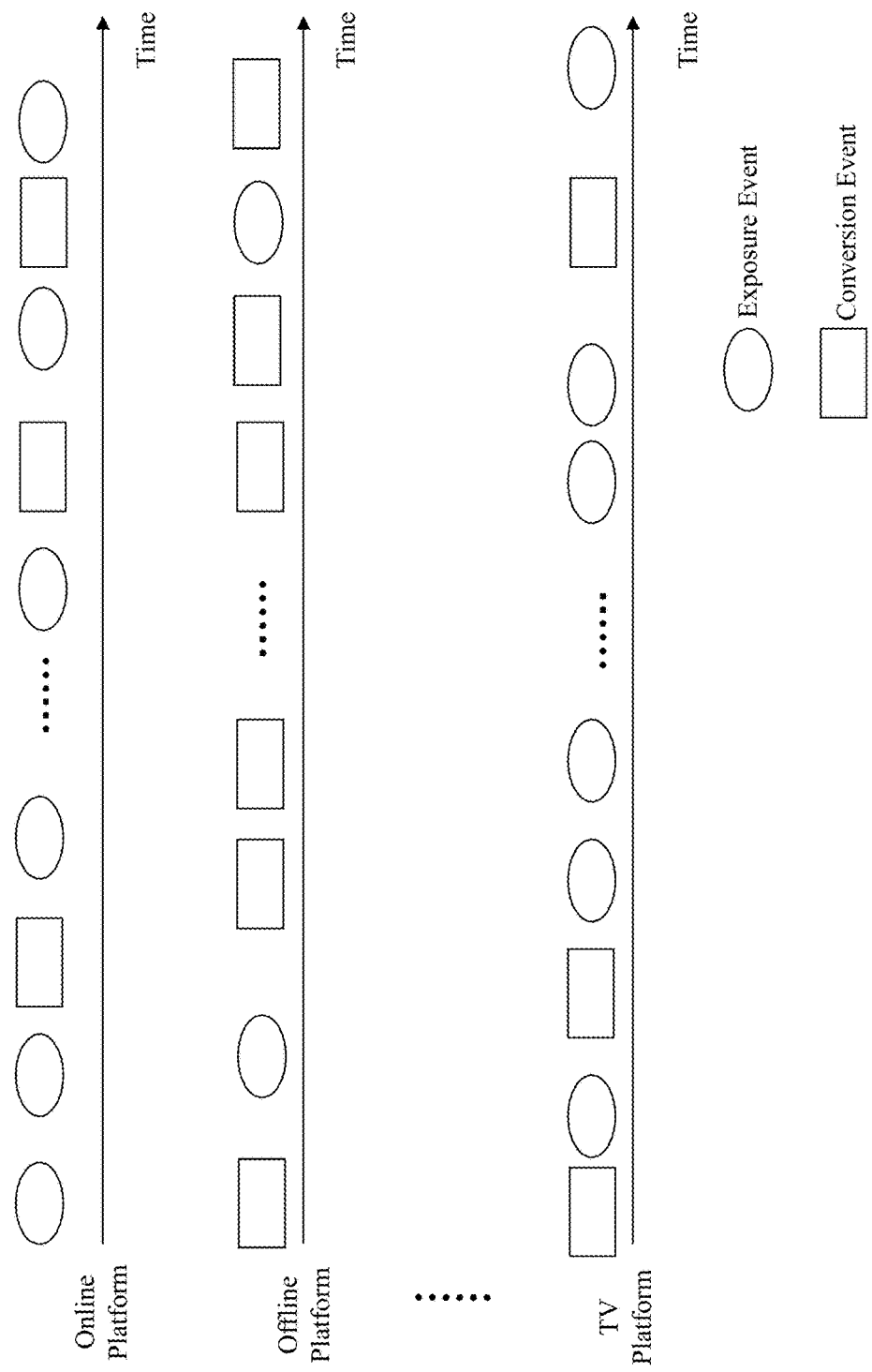
FIG. 2 illustrates exemplary discrete user events over time and across different platforms.

FIG. 2 illustrates exemplary discrete user events over time and across different platforms that may be detected and utilized in targeted advertising and conversion measurement. Each user event is associated with a particular user by which an activity with respect to a piece of content, e.g., an advertisement, is performed. In this illustration, user events may be either exposure events or conversion events. An exposure event may comprise consumption, either actively or passively by a user, of a piece of content, such as an advertisement or a television program. Thus, an exposure event may also be considered a media consumption event. A conversion event may comprise any event that is triggered by a prior exposure event, such as a transaction that is motivated by viewing the corresponding advertisement. In another example, navigating to the advertiser's website by clicking links on the corresponding advertisement may also be a conversion event. Thus, each conversion event may also be associated with a piece of content by which the conversion event is triggered, such as an advertisement.

The user events are discrete events at different dimensions, including user, time, space, platform, devices, or other dimensions. As shown in FIG. 2, user events may occur at different platforms, such as online platform, offline platform, TV platform, etc. Even on the same platform, user events may also occur on different devices. For example, a user may view an online advertisement on a PC, a laptop, a smartphone, or a tablet. As to the time dimension, each discrete event may occur at various time spans, for example, an hour, a day, a week, or even a year. Despite their occurrences among the different dimensions, user events may correspond with each other if, for instance, they are associated with the same user/user group or content. For example, a wife receives an e-mail advertisement of the newly released iPad mini and then tells her husband about it at dinner. One week later, the husband purchases the iPad mini at a local Apple Store as a birthday gift for the wife. The two events (viewing the e-mail advertisement and making the purchase at the local store) are discrete as they occurred at different times, on different platforms, and are associated with different persons. However, they have strong connections in targeted advertising, in particular, for measuring the effectiveness of the e-mail advertisement. The connections between discrete events shown in FIG. 2 can be identified by the integrated data mining mechanism 104 and utilized for various applications in advertisement serving optimization, such as user profiling, advertisement profiling, targeted advertising, and advertisement conversion measurement.

Figure 3:
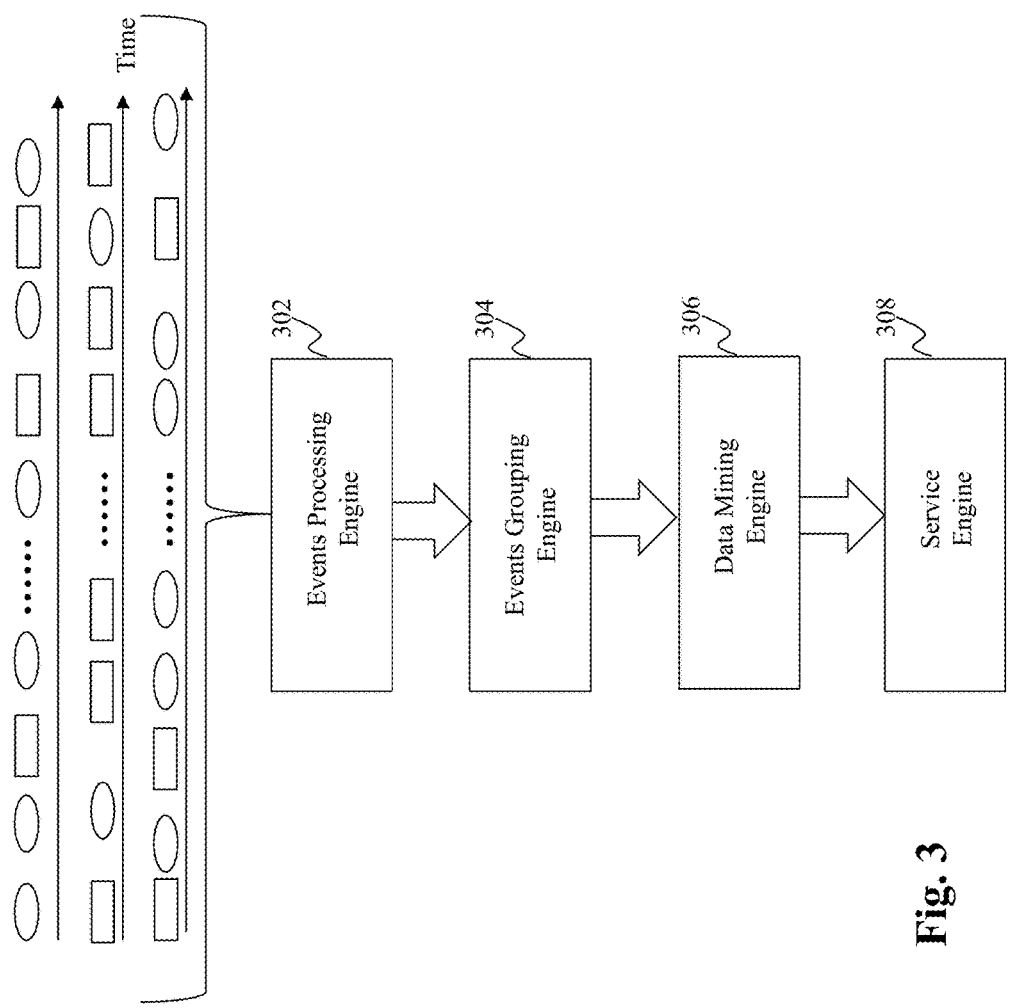
FIG. 3 is a high level exemplary system diagram of the integrated data mining mechanism shown in FIG. 1, according to an embodiment of the present teaching.

FIG. 3 is a high level exemplary system diagram of the integrated data mining mechanism 104, according to an embodiment of the present teaching. The integrated data mining mechanism 104 may include an events processing engine 302, an events grouping engine 304, a data mining engine 306, and a service engine 308. The events processing engine 302 interfaces with discrete events over time and across different platforms as illustrated above in FIG. 2. For each detected event, the events processing engine 302 identifies the user and/or the content that is associated with the event and creates an identifier (ID) for each of the events based on the user and/or the associated content. The events processing engine 302 may further identify the type of the event, e.g., an exposure event or a conversion event, or any other information associated with the event, e.g., the time, platform, device, etc. In other words, each user event can be digitalized by the events processing engine 302 and become an event ID associated with any related data. The processed events (event IDs with associated data) may be stored in a database and retrieved by the events grouping engine 304. The events grouping engine 304 then groups the processed events based on various criteria, such as the same user or user group or the same exposure content (e.g., the same advertisement). That is, discrete events that can be associated in different dimensions are identified and grouped by the events grouping engine 304 for further analysis. As described below in detail, a comprehensive analysis of the grouped events is performed by the data mining engine 306 to obtain meaningful information. The data mining results are fed into the service engine 308, which applies the meaningful information for different applications in advertisement serving optimization, such as user profiling, advertisement profiling, targeted advertising, and advertisement conversion measurement.

Figure 4:
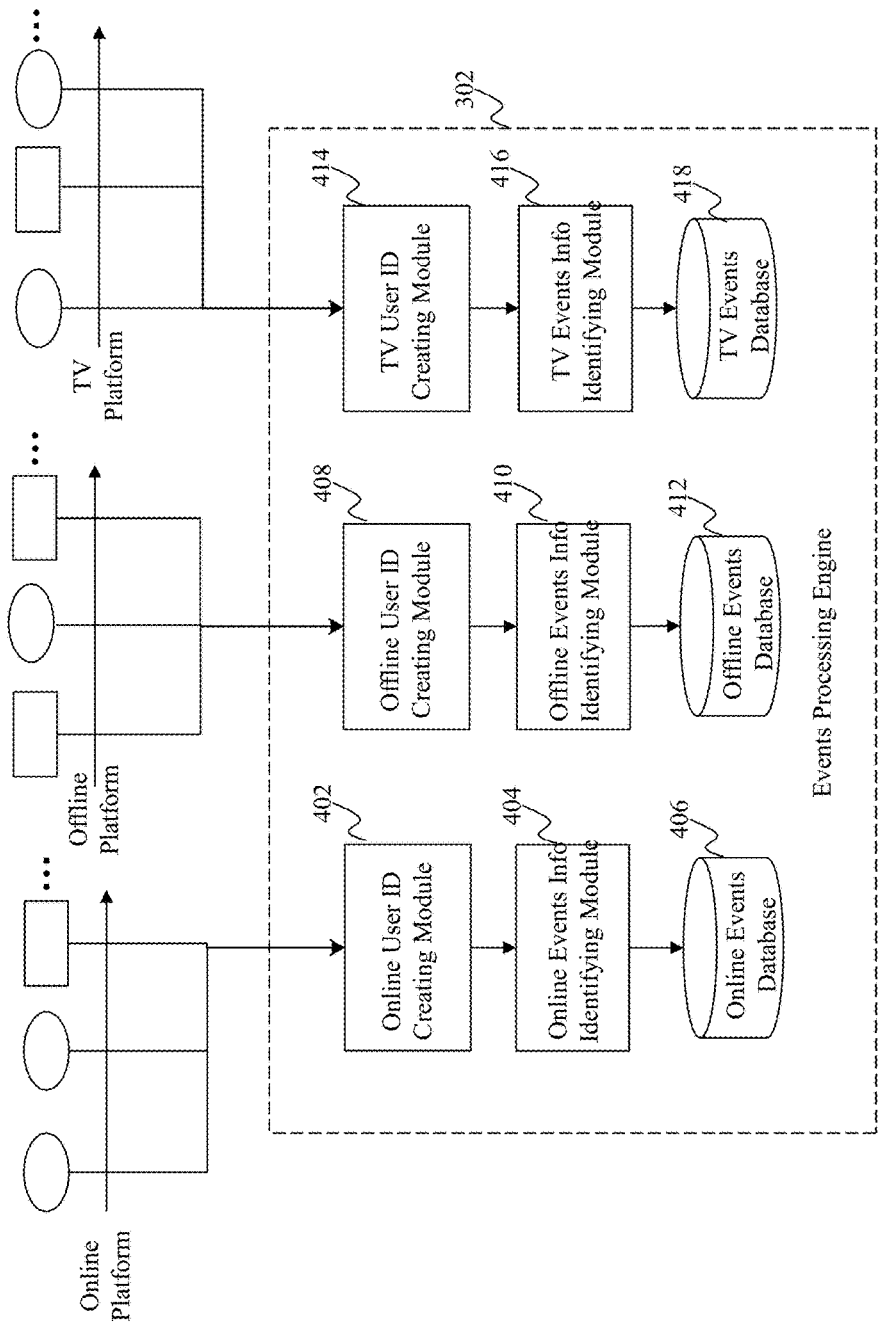
FIG. 4 depicts an exemplary diagram of an events processing engine in the system shown in FIG. 3, according to an embodiment of the present teaching.

FIG. 4 depicts an exemplary diagram of the events processing engine 302 in the system shown in FIG. 3, according to an embodiment of the present teaching. In this embodiment, although only events from online, offline, and TV platforms are illustrated, it is understood that user events from any other platforms may be processed by the events processing engine 302 in the similar manner as illustrated in this FIG. 4. In this embodiment, the events processing engine 302 includes an online user ID creating module 402, an online events information identifying module 404, and an online events database 406 for processing user events detected on the online platform. The online user ID creating module 402 creates a user ID for each event occurring online based on one or more attributes of the events, for example, user-related or device-related information (e.g., cookie, IP address, user account, device ID, etc.). In one example, the online user ID creating module 402 may comprise an application embedded in a webpage, which automatically creates a unique code for each detected user activity that occurs on the webpage based on user-related or device-related information. The online events information identifying module 404 identifies or retrieves information associated with each detected online event. The information includes, but is not limited to, the time at which the event occurs, the user who performs the activity, the device on which the event occurs, the type of the event (e.g., an exposure or conversion event), content associated with the event (e.g., advertisement, news articles, blog posts, etc.), and the online information source (e.g., webpage). The created online user ID is then associated with the identified online events information and stored into the online events database 406.

Similarly, for user events detected on the offline platform, the events processing engine 302 may include an offline user ID creating module 408, an offline events information identifying module 410, and an offline events database 412. In an embodiment, the offline user ID creating module 408 is responsible for generating an offline user ID for each offline activity based on user-related information, such as PII. The offline events information identifying module 410 identifies or retrieves information associated with each detected offline event. The information includes, but is not limited to, the time at which the event occurs, the user who performs the activity, the locale at which the event occurs, the type of the event (e.g., exposure or conversion event), and content associated with the event (e.g., advertisement, news articles, blog posts, etc.). The created offline user ID is then associated with the identified offline events information and stored into the offline events database 412. In another example, processing of offline user events may be performed by an information association mechanism 112 that is independent of the integrated data mining mechanism 104. In that situation, the integrated data mining mechanism 104 may have an agreement with the information association mechanism 112 to access its offline events database.

For user events detected on the TV platform, the events processing engine 302 may include a TV user ID creating module 414, a TV events information identifying module 416, and a TV events database 418. In an embodiment, the TV user ID creating module 414 is responsible for generating a TV user ID for each TV activity. In one example, the TV user ID creating module 414 may be part of a set-top box, and may monitor and collect user behaviors on the TV platform. The TV events information identifying module 416 and TV events database 418 may also be part of the set-top box, and may identify or retrieve information associated with each detected TV event and store the TV user ID with associated information, respectively.

Figure 5:
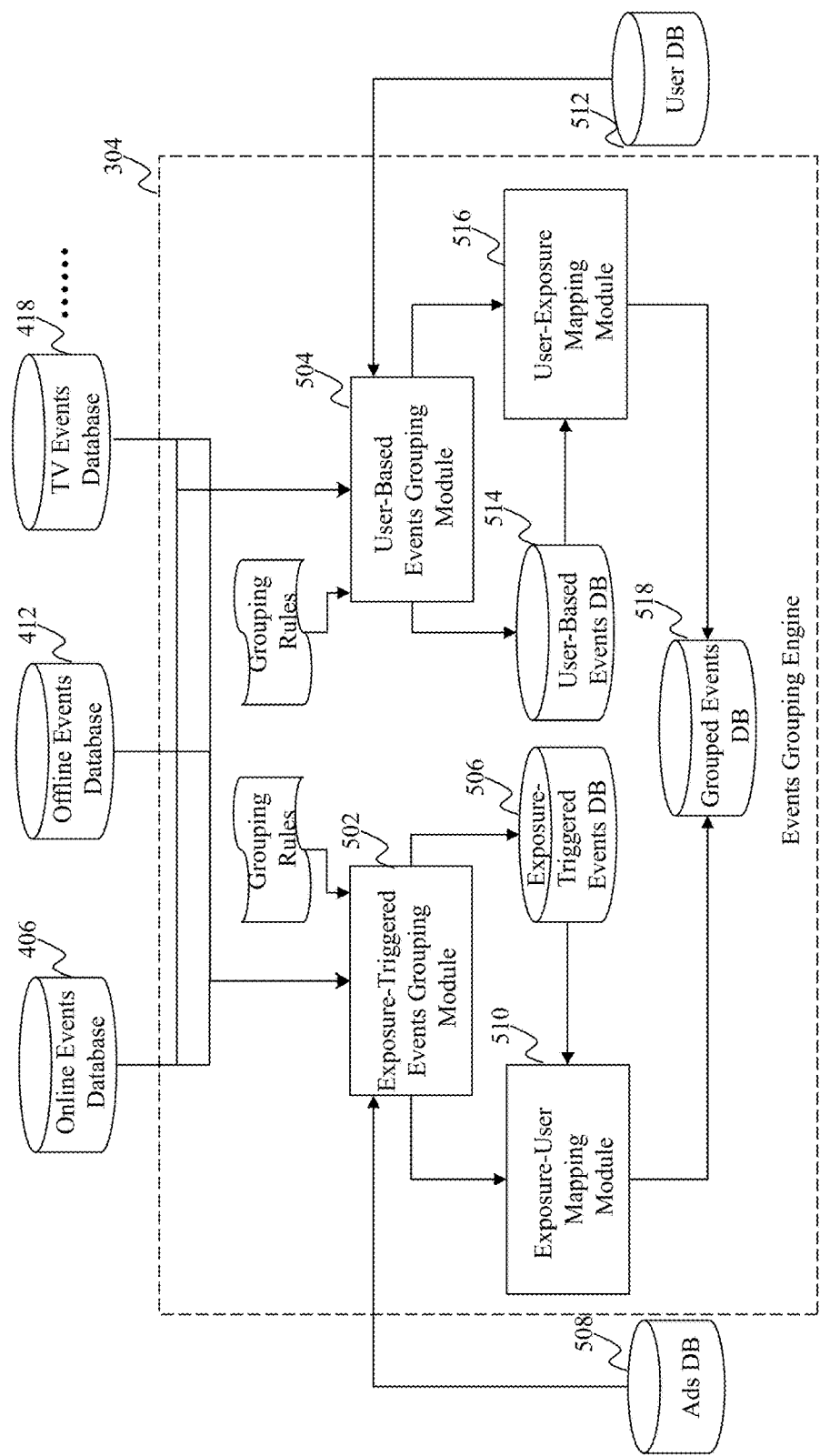
FIG. 5 depicts an exemplary diagram of an events grouping engine in the system shown in FIG. 3, according to an embodiment of the present teaching.

FIG. 5 depicts an exemplary diagram of the events grouping engine 304 in the system shown in FIG. 3, according to an embodiment of the present teaching. As illustrated, information from the online events database 406, offline events database 412, and TV events database 418 is fed into the events grouping engine 304 for identifying connections between the processed discrete events. The events grouping engine 304 in this embodiment includes an exposure-triggered events grouping module 502 and a user-based events grouping module 504. For the exposure-triggered events grouping module 502, the grouping is performed to identify all the events that are related to the same exposure content based on predefined grouping rules. In one example, exposure events related to the same exposure content (e.g., the same advertisement presented to different users on different platforms at different times) are grouped together and saved into the exposure-triggered events database 506. The grouped events may be saved in in association with previously-created user IDs. In another example, conversion events that are triggered by the same exposure content (e.g., transactions of a product or a service that is in the advertisement) may be grouped together. In still another example, exposure and conversion events that are related to the same exposure content are grouped together by the exposure-triggered events grouping module 502. In this embodiment, advertisement information is retrieved from an advertisement database 508 by the exposure-triggered events grouping module 502 in order to perform grouping based on the same exposed advertisement. In this embodiment, a second-stage grouping at the user level may be further conducted by an exposure-user mapping module 510, for example, when the first-stage grouping performed by the exposure-triggered events grouping module 502 does not distinguish different users associated with the grouped events. At this stage, events are further divided into sub-groups, each of which is associated with the same user or user group (e.g., household).

The user-based events grouping module 504, on the other hand, performs a user-based grouping at the first-stage based on predefined grouping rules. In one example, all the events associated with the same user are clustered by the user-based events grouping module 504 in conjunction with a user database 512, regardless of the time, platform, device, or the associated content, and are stored into the user-based events database 514. In another example, the user-based grouping may be performed for the household level such that all the events related to members of the same household are grouped. In still another example, other user groups, such as the same demographic group, the same social group, etc., may be used as a basis for user-based events grouping. In any event, a second-stage grouping based on the same associated content, e.g., advertisement, may be also conducted by a user-exposure mapping module 516 to further divide the user groups into sub-groups, each of which is related to the same content. Eventually, the sub-groups obtained from the exposure-user mapping module 510 and/or the user-exposure mapping module 516 are stored in the grouped events database 518. Each sub-group includes events associated with the same user/user group and the same exposure content.

Figure 6:
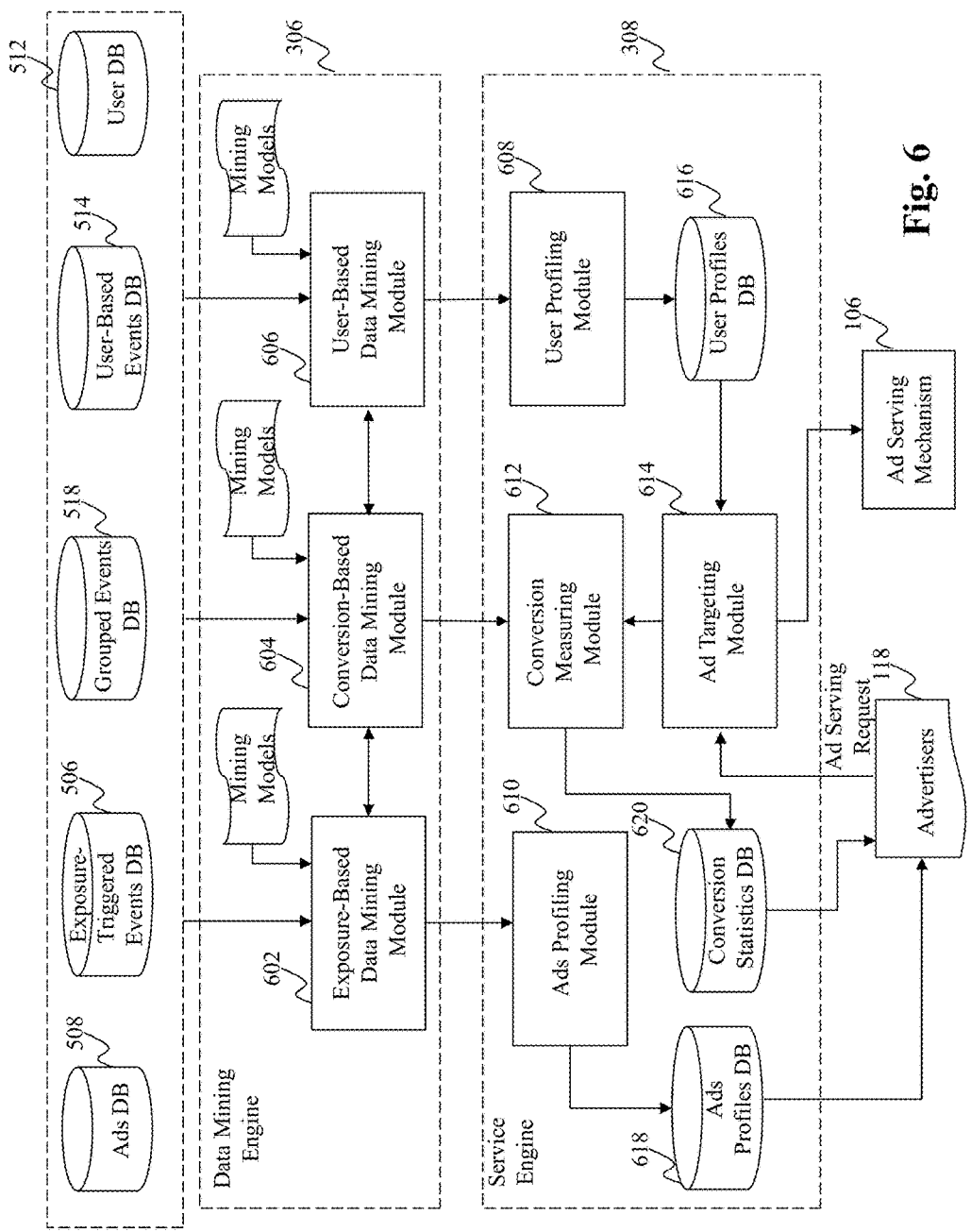
FIG. 6 depicts exemplary diagrams of a data mining engine and a service engine in the system shown in FIG. 3, according to an embodiment of the present teaching.

FIG. 6 depicts exemplary diagrams of the data mining engine 306 and service engine 308 in the system shown in FIG. 3, according to an embodiment of the present teaching. The data mining engine 306 includes a variety of data mining modules, such as an exposure-based data mining module 602, a conversion-based data mining module 604, and a user-based data mining module 606, each of which performs a data mining analysis based on a respective model. Each data mining module shares data sources with grouped events data stored in databases, such as the exposure-triggered events database 506, user-based events database 514, grouped events database 518, advertisement database 508, and user database 512. The exposure-based data mining module 602 analyzes events associated with the same exposure content (e.g., an advertisement). Data mining results from the exposure-based data mining module 602 may, for example, comprise information regarding popularity of an advertisement with respect to demographic groups, geographic regions, platforms, devices, serving time, etc. The conversion-based data mining module 604 focuses on analyzing events that trigger a particular conversion. For example, each time a particular product is purchased at a local or online store, the conversion-based data mining module 604 may analyze information related to the grouped events to find out whether the sale is triggered by an advertisement of the particular product presented to the same user who made the purchase. The user-based data mining module 606 analyzes user behaviors, such as purchase behaviors, of a particular user or a user group through all the events related to the same user or user group in order to determine the interests of the particular user or user group. It is understood that the data mining engine 306 may include additional (or alternative) modules that analyze the grouped events data based on any suitable data mining model. Moreover, for some analysis (e.g., advertisement conversion measurement), more than one data mining module may work together in order to achieve the desired results.

The data mining results obtained from the data mining engine 306 are provided to the service engine 308 for different applications. In this embodiment, the service engine 308 performs user profiling by a user profiling module 608, advertisement profiling by an advertisement profiling module 610, advertisement conversion measurement by a conversion measuring module 612, and targeted advertising by an advertisement targeting module 614. The user profiling module 608 determines a user's long-term and short-term interests of topics, brands, products, or services by looking into both the user's media consumption patterns obtained from the user's exposure events and also the user's purchase behaviors obtained from the user's conversion events. User profiles created and updated by the user profiling module 608 are stored in the user profiles database 616. Similarly, the advertisement profiling module 610 is responsible for creating profiles of each particular advertisement. The advertisement profile may include information about, for example, popularities of the advertisement with respect to demographic groups, geographic regions, platforms, devices, serving time, etc. The advertisement profiles may be stored in an advertisement profiles database 618 and provided to the advertisers 118 as desired.

The applications of the service engine 308 also include targeted advertising and conversion measurement in response to advertisement serving requests from the advertisers 118. The request may include information of the targeted users, such as demographic or lifestyle date of desired audience, or information related to the advertisement itself, such as the topic of the advertisement. Based on the information in the request, the advertisement targeting module 614 may determine targeted users by matching the request information with user profile information. The identified targeted users are then served with the advertisement by the advertisement serving mechanism 106. After the advertisement is served, the advertisement targeting module 614 notifies the conversion measuring module 612 about whom the targeted users are and which advertisement has been served such that the conversion measuring module 612 can track each targeted user's conversion events to identify all the conversion events that are triggered by the served advertisement. The tracked information and measured conversion rate are stored in a conversion statistics database 620 and fed back to the advertisers 118 about the effectiveness of the served advertisement.

More detailed disclosures of various aspects of the system 100 are covered in different U.S. patent applications entitled "METHOD AND SYSTEM FOR RECOMMENDING TARGETED TELEVISION PROGRAMS BASED ON ONLINE BEHAVIOR" (the instant application), "METHOD AND SYSTEM FOR TARGETED ADVERTISING BASED ON ASSOCIATED ONLINE AND OFFLINE USER BEHAVIORS," "METHOD AND SYSTEM FOR ADVERTISEMENT CONVERSION MEASUREMENT BASED ON ASSOCIATED DISCRETE USER ACTIVITIES," and "METHOD AND SYSTEM FOR ASSOCIATING DISCRETE USER ACTIVITIES ON MOBILE DEVICES" (having application Ser. No. 14/289,550, filed 28 May 2014, application Ser. No. 14/289,564, filed 28 May 2014, and application Ser. No. 14/289,559, filed 28 May 2014).

Figure 7:
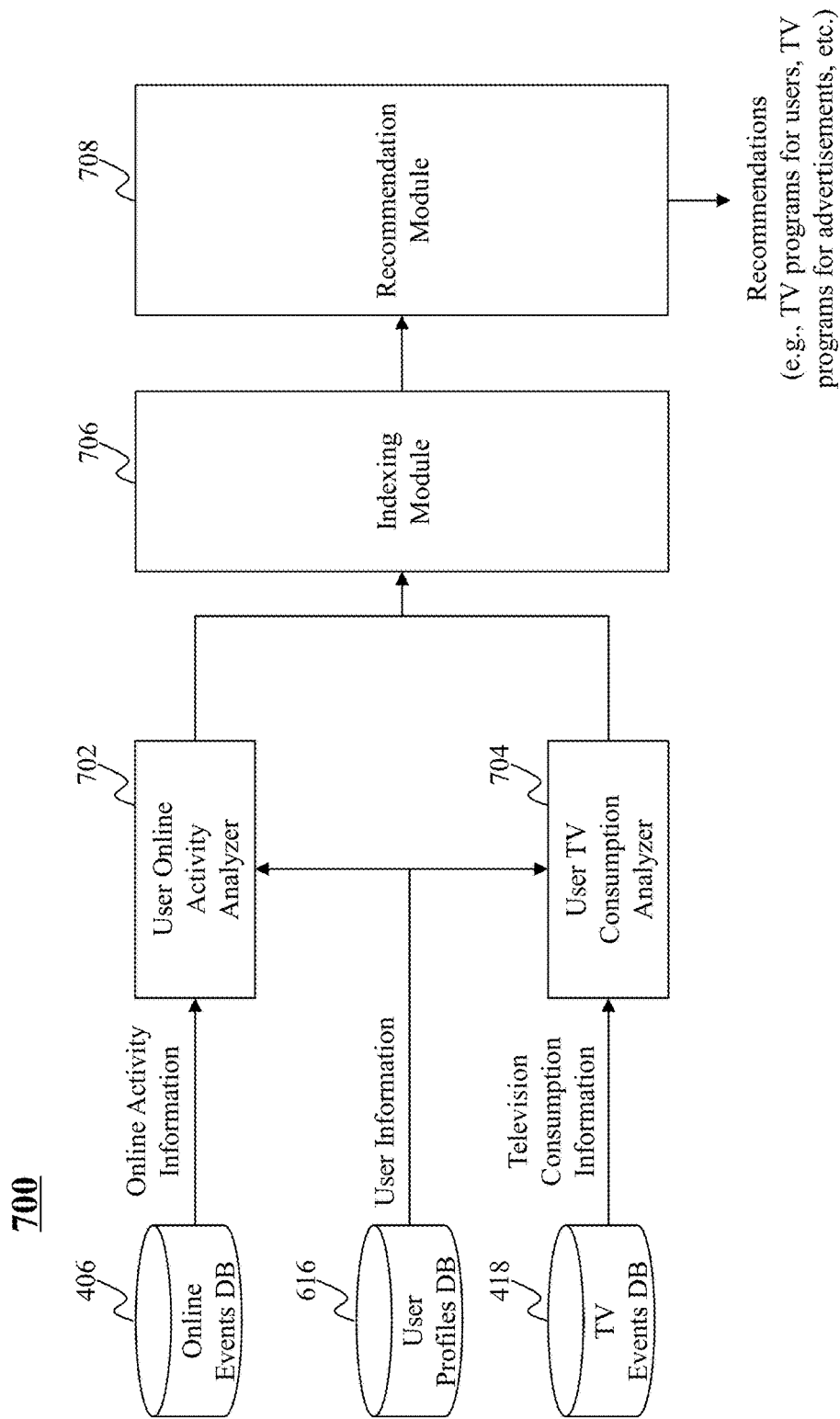
FIG. 7 depicts an exemplary diagram of a system for recommending targeted television programs based on online behavior and/or other information, according to an embodiment of the present teaching.

FIG. 7 depicts an exemplary diagram of a system 700 for recommending targeted television programs based on online behavior and/or other information, according to an embodiment of the present teaching. In an embodiment, the system 700 utilizes online activity information from the online events database 406, television consumption information from the television events database 418, and/or user information from user profiles database 616 to recommend television programs (or other items) for users and/or advertisements. Other types of information (e.g., offline activity information) may additional or alternatively be used to recommend the television programs. As used herein, a television program comprises a television show, an episode of the television show, a portion of the television episode, or other segment of content intended for television.

In some embodiments, a television program is recommended to a user. In one scenario, the online activity information indicates online activities performed by users, and the television consumption information indicates television programs consumed by the users. The indexing module 706 correlates the online activity information with the television consumption information (or vice versa) to determine online activities and television programs that are respectively performed and consumed by the same user (e.g., based on the online activities and the television programs being associated with identifiers that correspond to one another). An online activity and a television program are determined to be respectively performed and consumed by the same user with or without user information identifying a specific user (or user account) that performed the online activity and consumed the television program. For example, in some embodiments, the online activity information indicates that the online activity was performed by a user associated with a tag "ABC," and the television consumption information indicates that the television program was consumed by a user associated with a tag "XYZ." The tags "ABC" and "XYZ" are determined by indexing module 706 to be associated with the same user based on a determination that the tags correspond to one another (e.g., based on information from a third party) even though the indexing module 706 is unaware of any PII of the user, the user account(s) to which the tags actually correspond, etc. In some embodiments, tags are unique identifiers generated based on information regarding the user's device, IP address, etc. (e.g., device identifier, browser identifier, IP address, etc.).

In another scenario, the indexing module 706 determines characteristics related to the online activities performed by that user, and then generate an index that associates the characteristics with the television programs consumed by that user. The recommendation module 708 determines a television program that has not yet been consumed by the user, but that is associated in the index with a characteristic with which television programs consumed by the user are associated. The television program (that has not yet been consumed by the user) is then recommended to the user. It should be noted that while, in some embodiments, aspects of the present teaching are described herein with respect to a "user," the aspects may be applied in other embodiments to a "household" of users, a region of users, or other set of users (e.g., a television program is recommended to a household of users, a television program is recommended for a specific region, etc.).

As another example, a television program is recommended to a user based on a determination that other users (similar to the user) consumed the recommended television program or other television programs related to the recommended television program. In some embodiment, users are determined to be similar to one another based on the users exhibiting similar online behaviors (e.g., performing many of the same or similar online activities), the users exhibiting similar offline behaviors (e.g., performing many of the same or similar offline activities), the users exhibiting similar television consumption behaviors (e.g., consuming many of the same or similar television programs), or other criteria.

In one use case, the user online activity analyzer 702 determines users that are similar to one another based on the online activity information and the user information. The online activity information, for instance, indicates that certain users are similar to one another based on a determination that the users frequently visit the same type of diet websites (e.g., low carb diet websites, juicing diet websites, etc.), read the same genre of blogs, or perform other online activities that are performed by other ones of the users.

In another use case, the user television consumption analyzer 704 determines users that are similar to one another based on the television consumption information and the user information. The television consumption information, for instance, indicates that certain users are similar to one another based on a determination that the users consume many of the same television programs or the same genre of television programs.

In yet another use case, a user offline activity analyzer (not shown for illustrative convenience) determines users that are similar to one another based on offline activity information from offline events database 412 and the user information. The offline activity information, for instance, indicates that certain users are similar to one another based on a determination that the users purchased the same (or similar) products or services, purchased products or services at the same retail stores, or perform other offline activities that are performed by other ones of the users.

In a further use case, the user online activity analyzer 702, the user television consumption analyzer 704, and/or the user offline activity analyzer work in conjunction with one another to determine users that are similar to one another. Certain users are, for instance, determined to be similar to one another based on the users frequently performing at least one of the following: visiting a website related to a television program, consuming episodes of the television program, or purchasing products related to the television program at a physical store. With respect to the above use cases, the user online activity analyzer 702, the television consumption analyzer 704, and/or the user offline activity analyzer thereafter provide the information regarding similar users to the indexing module 706, the recommendation module 708, or other components for further processing.

As yet another example, a television program is recommended for an advertisement. As discussed above, in one scenario, the online activity information indicates online activities performed by users, and the television consumption information indicates television programs consumed by the users. The indexing module 706, for instance, correlates the online activity information with the television consumption information (or vice versa) to determine online activities and television programs that are respectively performed and consumed by the same user (e.g., based on the online activities and the television programs being associated with identifiers that correspond to one another). The indexing module 706 determines characteristics related to the online activities performed by that user, and then generate an index that associates the characteristics with the television programs consumed by that user. The recommendation module 708 determines an advertisement that is related to one or more of the characteristics in the index. The recommendation module 708 then generates a recommendation indicating that the advertisement should be inserted or otherwise presented with one or more television programs in the index based on a determination that the one or more television programs are associated with the characteristics related to the advertisement.

In yet another scenario, upon determination the advertisement related to the characteristics in the index, the recommendation module 708 generates a recommendation indicating that the advertisement should be inserted or otherwise presented with one or more television programs that are related to the television programs (in the index) associated with the characteristics (related to the advertisement).

Figure 8:
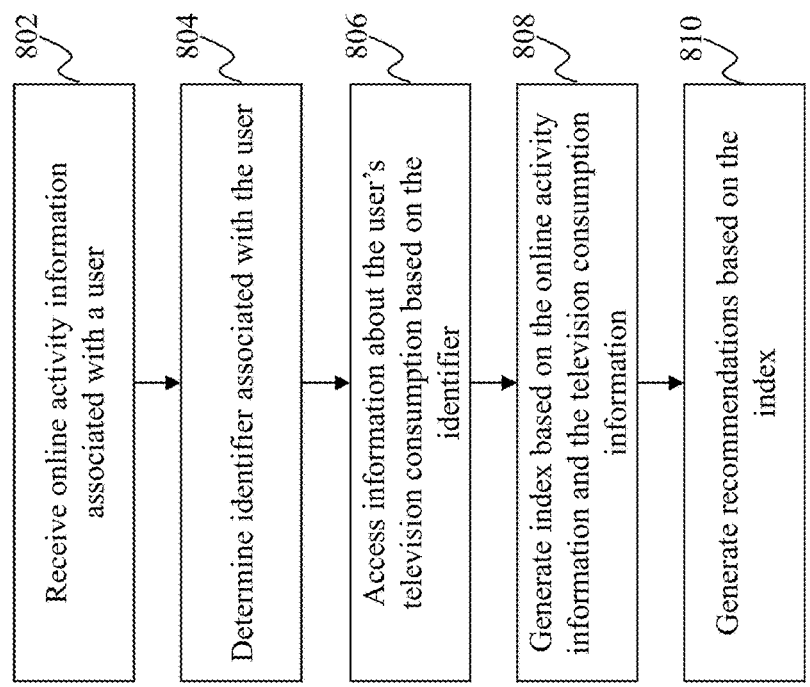
FIG. 8 is a flowchart of an exemplary process for recommending targeted television programs based on online behavior and/or other information, according to an embodiment of the present teaching.

FIG. 8 is a flowchart of an exemplary process for recommending targeted television programs based on online behavior and/or other information, according to an embodiment of the present teaching. At 802, online activity information associated with a user is received. The online activity information, for example, comprises information related to one or more online activities of the user and/or other online activities of other users. In some embodiments, the one or more online activities comprises accessing of online content by the user, posting of online content by the user, an online transaction associated with the user, or other online activity of the user.

At 804 and 806, an identifier associated with the user is determined, and information about the user's television consumption is accessed based on the identifier. For example, in some embodiments, each online activity indicated by the online activity information is associated with one or more user attributes that can be used to identify the respective user. The user attributes may comprise PII or any other information (e.g., a cookie, IP address, etc.). A user attribute associated with an online activity (indicated by the online activity information) may be utilized to determine a television program consumed by the user that performed the online activity, for example, by matching the user attribute associated with the online activity to a user attribute associated with a television program indicated by the television consumption information.

At 808 and 810, an index is generated based on the online activity information and the television consumption information, and one or more recommendations are be generated based on the index. For example, in some embodiments, the index is generated such that the index associates a characteristic related to an online activity performed by the user (e.g., indicated by the online activity information) with a television program consumed by the user (e.g., indicated by the television consumption information). An advertisement is selected based on characteristics in the index. The selected advertisement is recommended for presentation with one or more television programs in the index based on a determination that the one or more television programs are associated with the characteristics, that the one or more television programs are related to television programs in the index that are associated with the characteristics, or other criteria.

Figure 9:
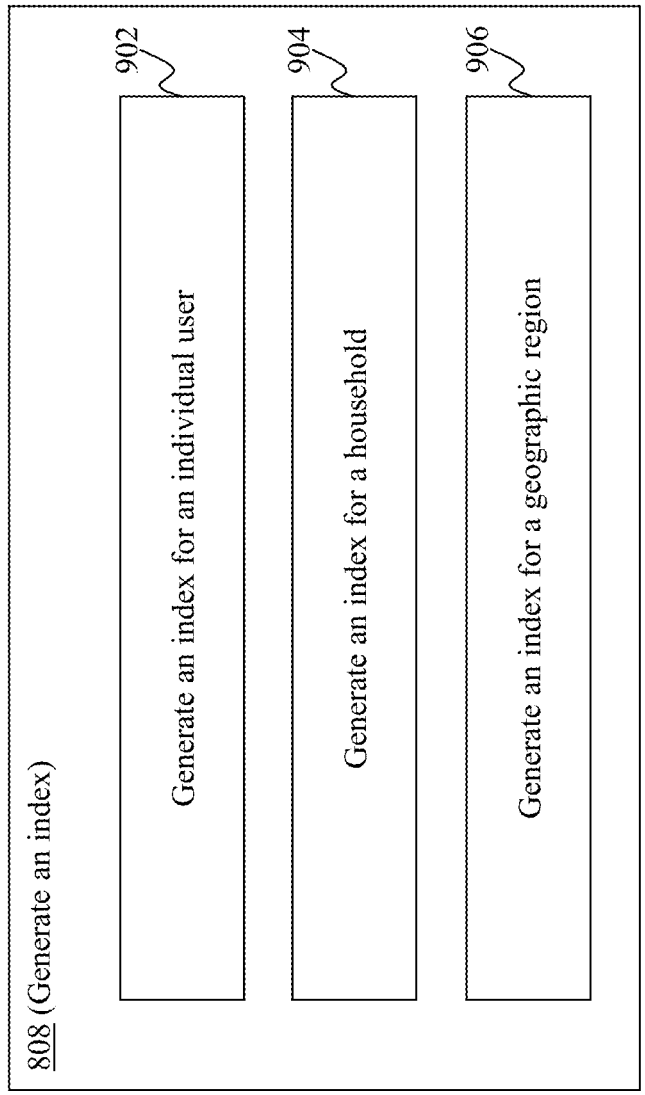
FIG. 9 depicts an exemplary diagram of the process for generating an index, according to an embodiment of the present teaching.

FIG. 9 depicts an exemplary diagram of the process for generating an index, according to an embodiment of the present teaching. As an example, 808 may comprise 902 (e.g., generating an index for an individual user). The index is, for instance, generated based on online activities of the user (and/or online activities of other users similar to the user) and television programs consumed by the user (and/or television programs consumed by other users similar to the user). In one use case, the index for the individual user associates characteristics related to online activities of the user with television programs consumed by the user (and/or associate characteristics related to online activities of other users similar to the user with television programs consumed by other users similar to the user). In some use cases, the index for the individual user is generated without regard to online activities of other users that are not similar to the user and/or without regard to television programs consumed by other users that are not similar to the user.

As another example, 808 may comprise 904 (e.g., generating an index for a household of users). The index may, for instance, be generated based on online activities of users of the household (and/or online activities of other households similar to the household) and television programs consumed by the users of the household (and/or television programs consumed by other households similar to the household). In one scenario, the index for the household associates characteristics related to online activities of the household with television programs consumed by the household (and/or associate characteristics related to online activities of other households similar to the household with television programs consumed by other households similar to the household). In some scenarios, the index for the household is generated without regard to online activities of other households that are not similar to the household and/or without regard to television programs consumed by other households that are not similar to the household.

As yet another example, 808 may comprise 906 (e.g., generating an index for a geographic region). The index may, for instance, be generated based on online activities of users of the geographic region (and/or online activities of other regions similar to the region) and television programs consumed by users of the region (and/or television programs consumed by other regions similar to the region). In one use case, the index for the geographic region user associates characteristics related to online activities of the region with television programs consumed by the region (and/or associate characteristics related to online activities of other regions similar to the region with television programs consumed by other regions similar to the region). In some use cases, the index for the region is generated without regard to online activities of other regions that are not similar to the region and/or without regard to television programs consumed by other regions that are not similar to the region.

Figure 10:
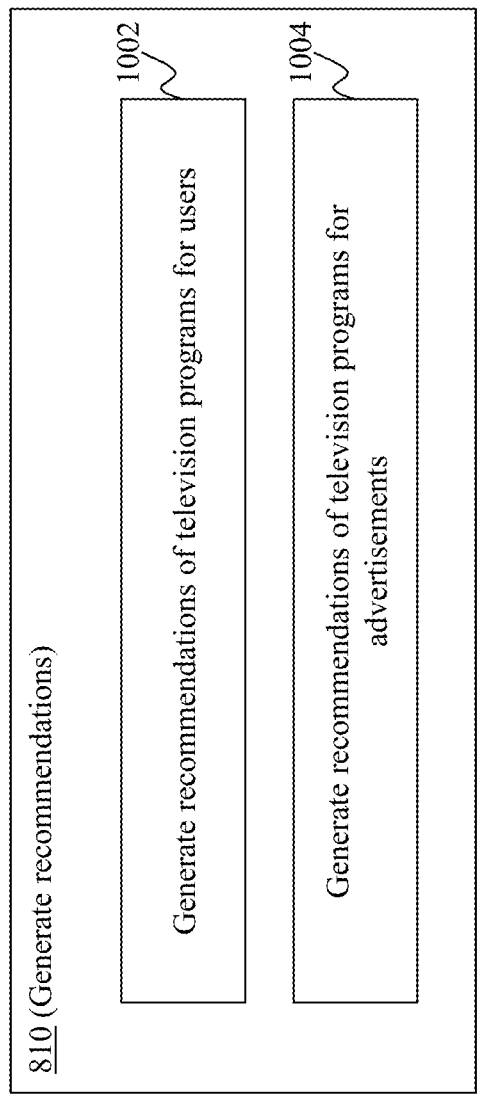
FIG. 10 depicts an exemplary diagram of the process for generating a recommendation, according to an embodiment of the present teaching.

FIG. 10 depicts an exemplary diagram of the process for generating a recommendation, according to an embodiment of the present teaching. As an example, 810 may comprise 1002 (e.g., generating one or more recommendations of television programs for users). As an example, a recommendation of a television program for a user is generated based an index indicating that the television program is associated with a characteristic with which television programs consumed by the user are associated. It should be noted that while, in some embodiments, aspects of the present teaching are described herein with respect to a "user," the aspects may be applied in other embodiments to a "household" of users, a region of users, or other set of users (e.g., a television program is recommended to a household of users, a television program is recommended for a specific region, etc.).

As another example, 810 may comprise 1004 (e.g., generating one or more recommendations of television programs for advertisements). As an example, a recommendation of a television program for an advertisement is generated based on the advertisement being related to a characteristic associated with the television program in the index. In one use case, the recommendation indicates that the advertisement should be inserted or otherwise presented with the television program.

Figure 11:
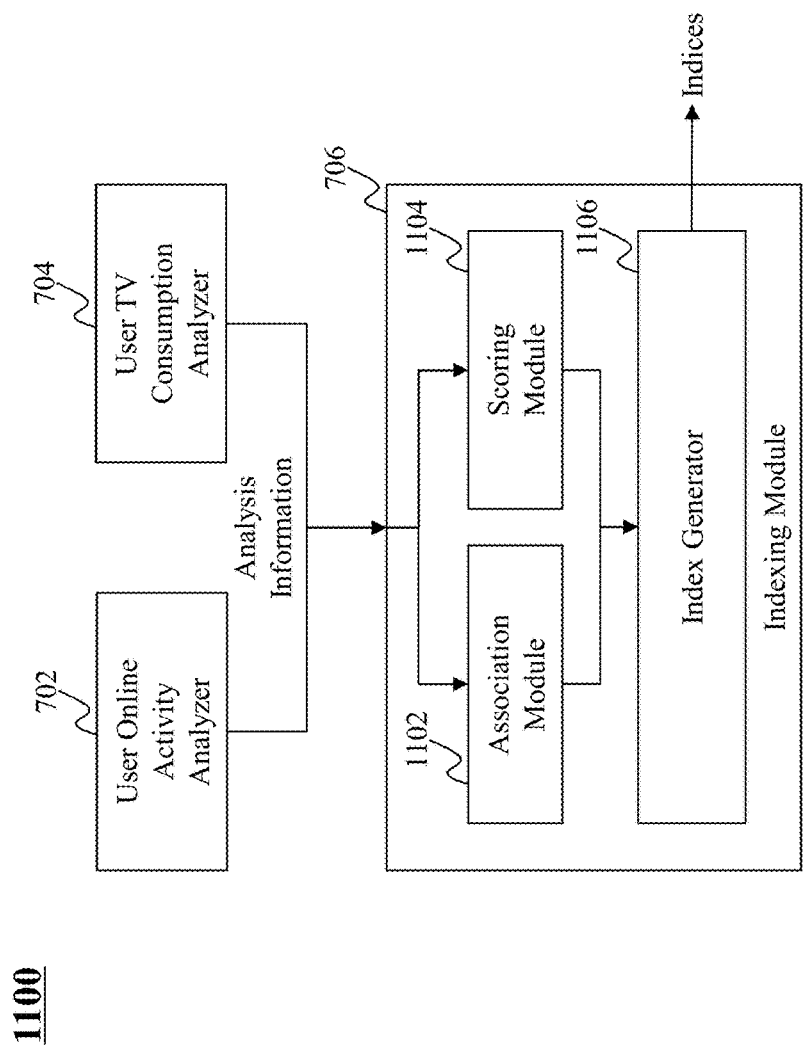
FIG. 11 depicts another exemplary diagram of a system for recommending targeted television programs based on online behavior and/or other information, according to an embodiment of the present teaching.

FIG. 11 depicts another exemplary diagram of a system 1100 for recommending targeted television programs based on online behavior and/or other information, according to an embodiment of the present teaching. As shown, analysis information comprising online activity information, television consumption information, or other information (e.g., offline activity information, user information, etc.) is provided by the user online activity analyzer 702, the user television consumption analyzer 704, or other components to the indexing module 706. In some embodiments, the online activity information indicates online activities performed by users or other information (e.g., the frequency in which the users performed the online activities, the amount of time that the user spent performing the online activities, the amount of the users that performed the online activities, etc.). The television consumption information indicates television programs consumed by the users or other information related to the television programs (e.g., the frequency of consumption by the users, the amount of time that the users spent consuming the television programs, the amount of the users that consumed the television programs, etc.).

In an embodiment, the online activity information and the television consumption information are received by the association module 1102 and the scoring module 1104. The association module 1102 and the scoring module 1104 may, for example, work in conjunction with one another to determine a characteristic related to at least one of the online activities performed by the users (e.g., indicated by the online activity information), determine a score for a television program consumed by the users (indicated by the television consumption information) and/or the characteristic, and associate the score with the television program and/or the characteristic. The association of the score, the television program, and/or the characteristic is then provided to the index generator 1106 to generate an index comprising the association of the score, the television program, and/or the characteristic.

By way of example, the score is determined based on the amount of the online activities related to the characteristic, an amount of the users that performed the online activities related to the characteristic, an amount of time that the users spent consuming the television program, or other criteria.

In one use case, responsive to an analysis of online activity information and television consumption information, it is determined that users that are frequent viewers of TV Program X are also frequent visitors of diet websites. The characteristic "diet" is then associated with TV Program X, and a score is determined for the TV Program X and the characteristic "diet." The score may, for instance, be based on how often or how much the users that watch TV program X visited diet websites, the number of the users that watch TV Program X also visit the diet websites, how often or how much time those users spend watching TV Program X, or other criteria. The association of the score, TV Program X, and the characteristic "diet" is then provided to the index generator 1106 to generate (or modify) an index to include the association of the score, TV Program X, and the characteristic "diet."

In a further use case, offline activity information is utilized to determine (or modify) the score associated with TV Program X and the characteristic "diet." For example, based on an analysis of the offline activity information, it is determined that users that watch the TV Program X also have purchased Brand Y diet pills at local retailers. The score associated with the TV Program X and the characteristic "diet" may, for example, be increased based on the determination of the users that watched TV Program X and purchased Brand Y diet pills at local retailers. In yet another use case, a second score is determined for TV Program X and the characteristic "Brand Y diet pills" based on the determination of the users that watched TV Program X and purchased Brand Y diet pills at local retailers (e.g., based on how often or how much the users that watch TV program X purchased Brand Y diet pills, the number of the users that watch TV Program X also purchased Brand Y diet pills, how often or how much time those users spent watching TV Program X, or other criteria).

In an embodiment, scores associated with television programs and their associated characteristics in an index is thereafter utilized to generate recommendations of television programs for users, advertisements, etc. In one scenario, for example, a recommendation to watch TV Program X (or a similar television program) is generated for users that perform online or offline activities related to the characteristic "diet." In another scenario, a recommendation to place advertisements related to the purchased Brand Y diet pills (or a competitor's diet pills of the same type) with TV Program X (or a similar television program) is generated based a high score associated with the TV Program X and the characteristic "diet" or a high score associated with the TV Program X and the characteristic "Brand X diet pills."

Figure 12:
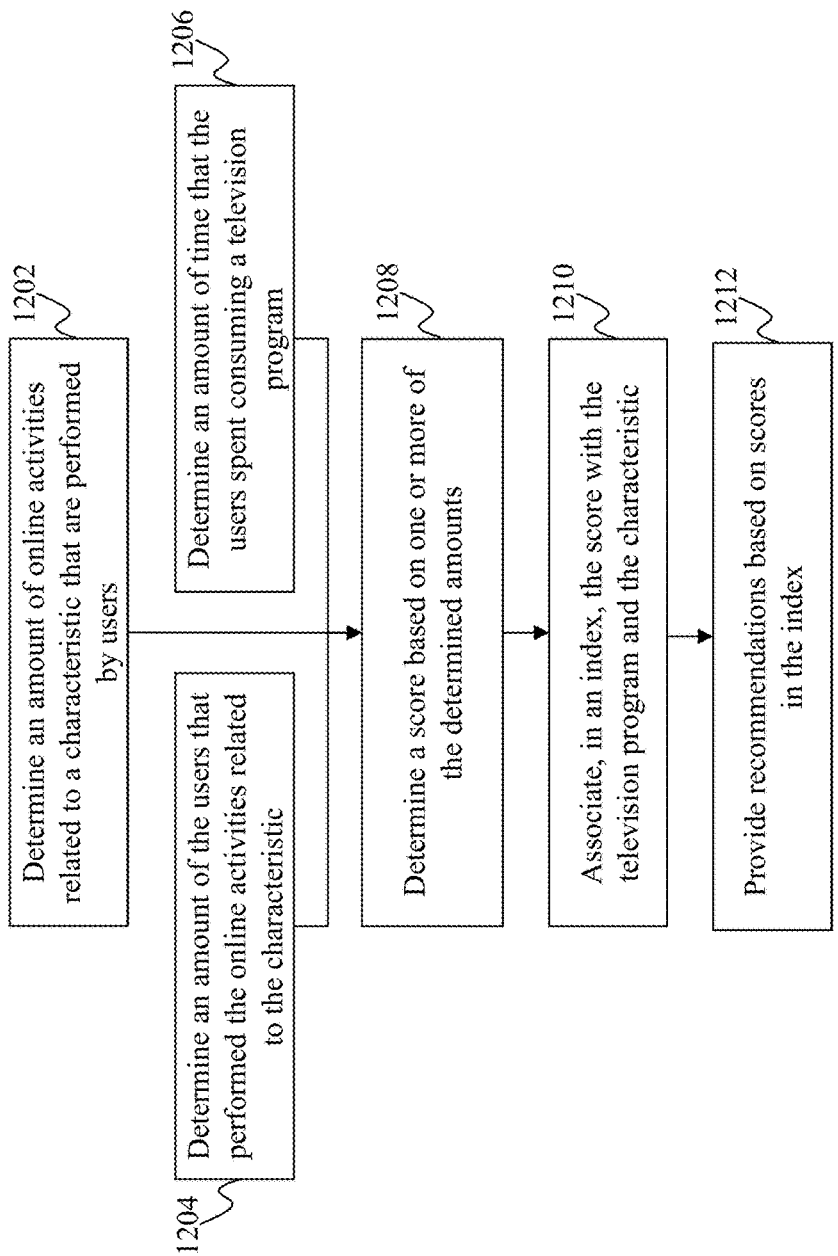
FIG. 12 is another flowchart of an exemplary process for recommending targeted television programs based on online behavior and/or other information, according to an embodiment of the present teaching.

FIG. 12 is another flowchart of an exemplary process for recommending targeted television programs based on online behavior and/or other information, according to an embodiment of the present teaching. As an example, at 1202, 1204, and 1206, an amount of online activities that are related to a characteristic and that are performed by users is determined along with an amount of the users that performed the online activities related to the characteristic and an amount of time that the users spent consuming a television program. At 1208 and 1210, a score is determined for the television program and the characteristic based on the determined amounts, and the score is associated in an index with the television program and the characteristic. At 1212, one or more recommendations are provided based on scores in the index.

FIG. 13 depicts indices that associate characteristics of online activities with television programs, according to an embodiment of the present teaching. For example, as shown in FIG. 13, a portion of the index 1302 associates the characteristic "Young Children" with television programs. Each of the combinations of respective ones of the television programs and the characteristic "Young Children" is associated with a score based on criteria described herein elsewhere (e.g., score of 215 for the television program "Victorious" and the characteristic "Young Children"). In one use case, the shown portion of the index 1302 resulted from information indicating that users (or households) that watch one or more of the listed television programs performed online activities (and/or offline activities) that are related to young children. The users (or households), for example, subscribed to parenting blogs, purchased products for young children from online retailers, or performed other online activities related to young children.

Moreover, as illustrated in FIG. 13, a portion of the index 1304 associates the characteristic "Angry Birds" with television programs. Each of the combination of respective ones of the television programs and the characteristic "Angry Birds" is associated with a score based on criteria described herein elsewhere (e.g., a score of 151 for the television program "The Office" and the characteristic "Angry Birds"). In one scenario, the shown portion of the index 1304 resulted from information indicating that the users (or households) that watch one or more of the listed television programs performed online activities (and/or offline activities) that are related to the game "Angry Birds." The users (or households), for example, played the game "Angry Birds" on a regular basis, purchased "Angry Birds" products, or performed other online activities related to the game "Angry Birds."

Figure 14:
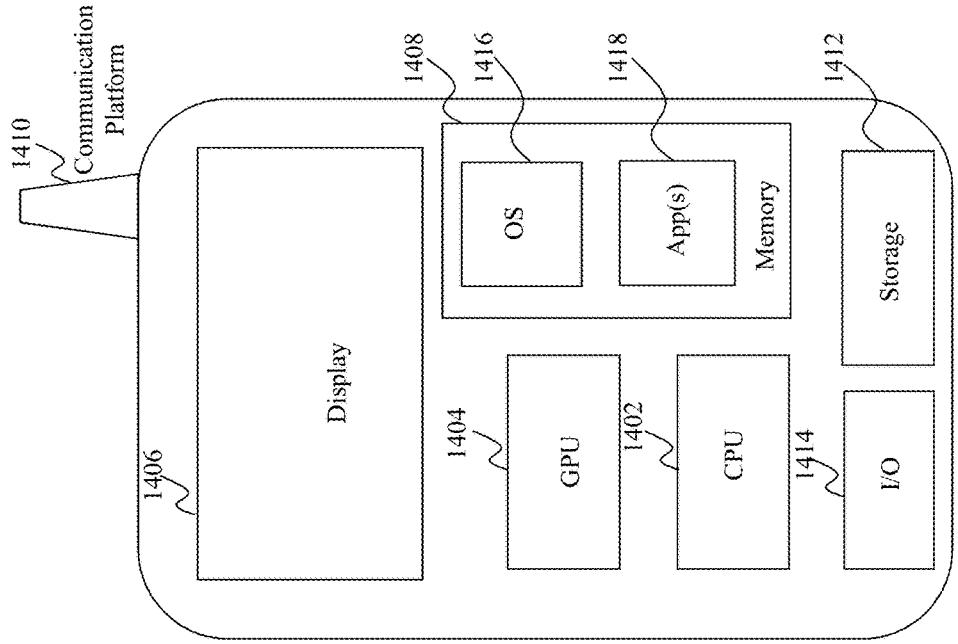
FIG. 14 depicts a general mobile device architecture on which the present teaching can be implemented.

FIG. 14 depicts a general mobile device architecture on which the present teaching can be implemented. In this example, the user device on which advertisement is presented is a mobile device 1400, including but is not limited to, a smart phone, a tablet, a music player, a handled gaming console, a global positioning system (GPS) receiver. The mobile device 1400 in this example includes one or more central processing units (CPUs) 1402, one or more graphic processing units (GPUs) 1404, a display 1406, a memory 1408, a communication platform 1410, such as a wireless communication module, storage 1412, and one or more input/output (I/O) devices 1414. Any other suitable component, such as but not limited to a system bus or a controller (not shown), may also be included in the mobile device 1400. As shown in FIG. 14, a mobile operating system 1416, e.g., iOS, Android, Windows Phone, etc., and one or more applications 1418 may be loaded into the memory 1408 from the storage 1412 in order to be executed by the CPU 1402. The applications 1418 may include a browser or any other suitable mobile apps for receiving and rendering content, such as advertisements, on the mobile device 1400. Execution of the applications 1418 may cause the mobile device 1400 to perform the processes as described above in the present teaching. For example, the display of advertisements to users may be made by the GPU 1404 in conjunction with the display 1406. User interactions with the advertisements may be achieved via the I/O devices 1414 and provided to the system via the communication platform 1410.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 15:
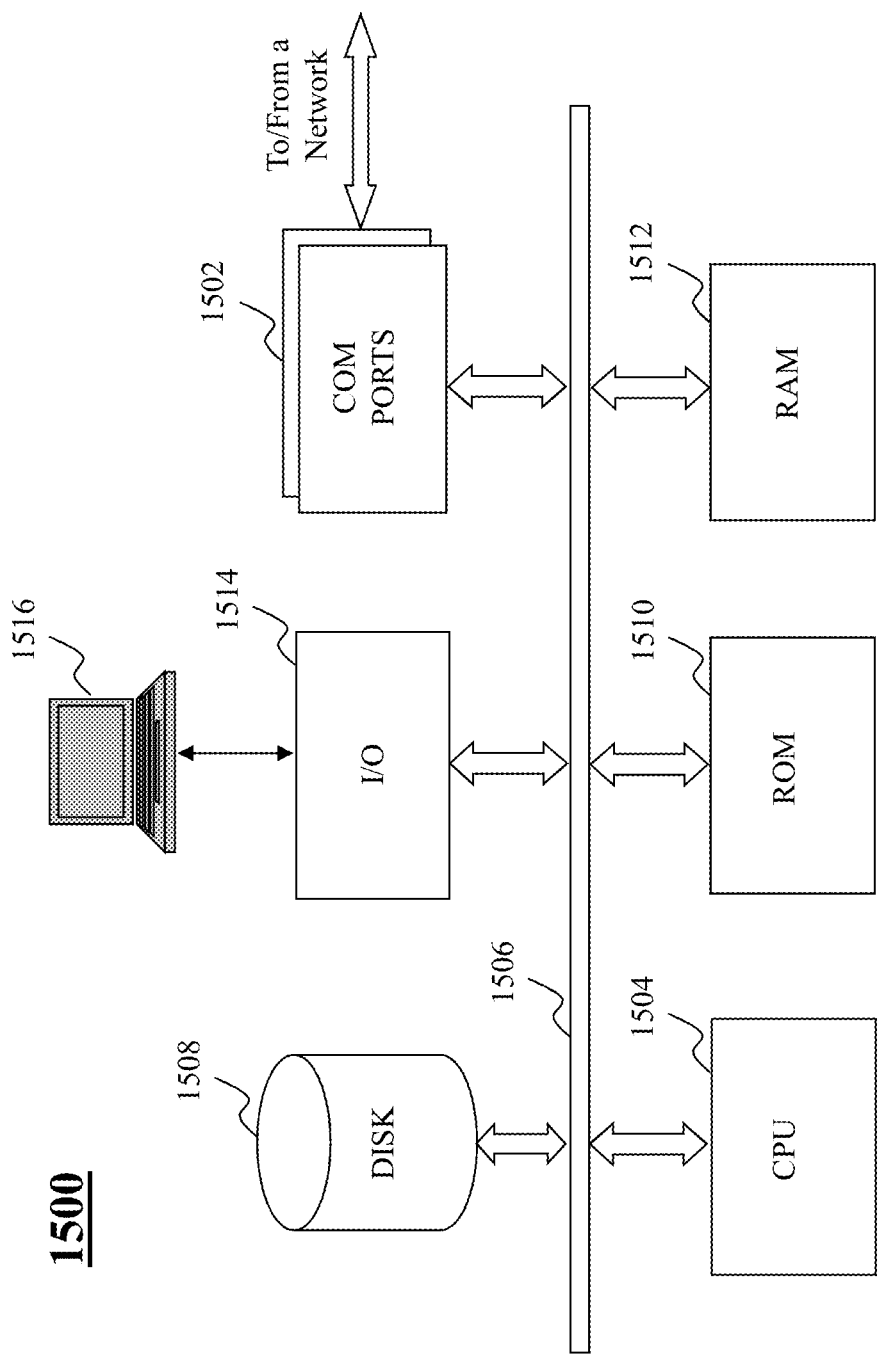
FIG. 15 depicts a general computer architecture on which the present teaching can be implemented.

FIG. 15 depicts a general computer architecture on which the present teaching can be implemented and has a functional block diagram illustration of a computer hardware platform that includes user interface elements. The computer may be a general-purpose computer or a special purpose computer. This computer 1500 can be used to implement any components of the targeted advertising and conversion measurement architecture as described herein. Different components of the system in the present teaching can all be implemented on one or more computers such as computer 1500, via its hardware, software program, firmware, or a combination thereof. Although only one such computer is shown, for convenience, the computer functions relating to targeted advertising and conversion measurement may be implemented in a distributed fashion on a number of similar platforms, to distribute the processing load.

The computer 1500, for example, includes COM ports 1502 connected to and from a network connected thereto to facilitate data communications. The computer 1500 also includes a central processing unit (CPU) 1504, in the form of one or more processors, for executing program instructions. The exemplary computer platform includes an internal communication bus 1506, program storage and data storage of different forms, e.g., disk 1508, read only memory (ROM) 1510, or random access memory (RAM) 1512, for various data files to be processed and/or communicated by the computer, as well as possibly program instructions to be executed by the CPU 1504. The computer 1500 also includes an I/O component 1514, supporting input/output flows between the computer and other components therein such as user interface elements 1516. The computer 1500 may also receive programming and data via network communications.

Hence, aspects of the method of targeted advertising and conversion measurement, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teaching is amenable to a variety of modifications and/or enhancements. For example, although the implementation of various components described above may be embodied in a hardware device, it can also be implemented as a software only solution. In addition, the components of the system as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teaching.

We claim:

1. A method for facilitating a television program presentation and content insertion thereto, the method being implemented on a machine having at least one processor, storage, and a communication platform, the method comprising:
   receiving, by a user online activity analyzer, information related to online activities of a plurality of users;
   identifying, by the user online activity analyzer, based on the online activity information, a characteristic that is shared by a group of the plurality of users;
   accessing, by a user television consumption analyzer, television consumption information of the group of users;
   determining, by the user television consumption analyzer, one or more television programs consumed by the group of users based on the television consumption information;
   determining, by an indexing module, an index that correlates the characteristic shared by the group of users, each of the one or more television programs, and a score corresponding to each of the one or more television programs based on an amount of online activity related to the characteristic, an amount of users performing online activity related to the characteristic, or an amount of time or frequency that users consume the corresponding television program; and
   generating, by a recommendation module, a recommendation of a first television program from the one or more television programs to be presented with an advertisement based on the index and score for the first television program relative to the other scores for the other television programs,
   wherein the advertisement is inserted in a presentation of the first television program and is identified as being associated with the characteristic shared by the group of users.

2. The method of claim 1, wherein determining the score is based on the amount of online activity related to the characteristic or the amount of users performing online activity related to the characteristic.

3. The method of claim 1, wherein determining the score comprises determining the score is based on the number of users in the group of users who consumed the respective television program.

4. The method of claim 1, wherein determining the score comprises determining the score is based on the amount of time that the group of users spent consuming the respective television program.

5. The method of claim 1, wherein the recommendation of the first television program is generated based on at least one of pricing information associated with the first television program or volume information associated with the first television program,
   wherein the pricing information comprises information related to cost of purchasing time during a presentation of the first television program, and
   wherein the volume information comprises information related to quantity of viewers during the presentation of the first television program.

6. The method of claim 1, further comprising:
   receiving information related to offline activities of the plurality of users,
   wherein identifying the shared characteristic comprises identifying the shared characteristic of the group of users based on the online activity information and the offline activity information.

7. The method of claim 6, wherein the one or more offline activities comprise one or more offline transactions.

8. The method of claim 1, wherein identifying the shared characteristic comprises identifying the shared characteristic of the group of users based on, an amount of online activities performed by the group of users that are related to a same type of online resources.

9. The method of claim 1, wherein the group of users comprises a first group of users, wherein determining the score comprises determining one or more first correlation scores associated with the shared characteristic of the first group of users and the one or more television programs, the method further comprising:
   identifying, based on the online activity information, a characteristic shared by a second group of users;
   accessing information related to television consumption of the second group of users; determining one or more other television programs based on the television consumption information of the second group of users; determining one or more second correlation scores associated with the shared characteristic of the second group of users and the one or more other television programs; and generating an index indicating (i) the shared characteristic of the first group of users, (ii) the one or more first correlation scores, (iii) the shared characteristic of the second group of users, and (iv) the one or more second correlation scores, wherein the advertisement is recommended to be presented with the television program based on the generated index.

10. The method of claim 1, wherein the one or more online activities comprises at least one of accessing of online content, posting of online content, or making an online transaction.

11. A system having at least one processor, storage, and a communication platform for facilitating a television program presentation and content insertion thereto, the system comprising:
   a user online activity analyzer configured to receive information related to one or more online activities of a plurality of users, and identify a characteristic that is shared by a group of the plurality of users based on the online activity information;
   a user television consumption analyzer configured to access television consumption information of the group of users, and determine one or more television programs consumed by the group of users based on the television consumption information;
   an indexing module configured to determine an index that correlates the characteristic shared by the group of users, each of the one or more television programs, and a score corresponding to each of the one or more television programs based on an amount of online activity related to the characteristic, an amount of users performing online activity related to the characteristic, or an amount of time or frequency that users consume the corresponding television program; and
   a recommendation module configured to generate a recommendation of a first television program from the one or more television programs to be presented with an advertisement based on the index and score for the first television program relative to the other scores for the other television programs, wherein the advertisement is inserted in a presentation of the first television program and is identified as being associated with the characteristic shared by the group of users.

12. The system of claim 11, wherein determining the score is based on the amount of online activity related to the characteristic or the amount of users performing online activity related to the characteristic.

13. The system of claim 11, wherein determining the score comprises determining the score is based on the number of users in the group of users who consumed the respective television program.

14. The system of claim 11, wherein determining the score comprises determining the score is based on the amount of time that the group of users spent consuming the respective television program.

15. The system of claim 11, wherein identifying the shared characteristic comprises identifying the shared characteristic of the group of users based on an amount of online activities performed by the group of users that are related to a same type of online resources.

16. A non-transitory machine-readable medium having information recorded thereon for facilitating a television program presentation and content insertion thereto, wherein the information, when read by the machine, causes the machine to perform the following:
   receiving information related to online activities of a plurality of users;
   identifying, based on the online activity information, a characteristic that is shared by a group of the plurality of users;
   accessing television consumption information of the group of users;
   determining one or more television programs consumed by the group of users based on the television consumption information;
   determining an index that correlates the characteristic shared by the group of users, each of the one or more television programs, and a score corresponding to each of the one or more television programs based on an amount of online activity related to the characteristic, an amount of users performing online activity related to the characteristic, or an amount of time or frequency that users consume the corresponding television program; and
   generating a recommendation of a first television program from the one or more television programs to be presented with an advertisement based on the index and score for the first television program relative to the other scores for the other television programs, wherein the advertisement is inserted in a presentation of the first television program and is identified as being associated with the characteristic shared by the group of users.

17. The medium of claim 16, wherein determining the score is based on the amount of online activity related to the characteristic or the amount of users performing online activity related to the characteristic.

18. The medium of claim 16, wherein determining the score comprises determining the score is based on the number of users in the group of users who consumed the respective television program.

19. The medium of claim 16, wherein determining the score comprises determining the score is based on the amount of time that the group of users spent consuming the respective television program.

* * * * *